(12) United States Patent
Wen et al.

(10) Patent No.: US 6,743,286 B2
(45) Date of Patent: Jun. 1, 2004

(54) INORGANIC PARTICLES AND METHODS OF MAKING

(75) Inventors: Fu-Chu Wen, Severna Park, MD (US); Duen-Wu Hua, Severna Park, MD (US); Deborah E. Busch, Pasadena, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 09/921,502

(22) Filed: Aug. 1, 2001

(65) Prior Publication Data

US 2003/0024437 A1 Feb. 6, 2003

Related U.S. Application Data

(60) Provisional application No. 60/308,963, filed on Jul. 30, 2001.

(51) Int. Cl.[7] ................................................. C09C 1/36
(52) U.S. Cl. ..................... 106/436; 106/463; 106/464
(58) Field of Search ................................ 106/436, 463, 106/464, 438, 442, 447, 449

(56) References Cited

U.S. PATENT DOCUMENTS

| | | | |
|---|---|---|---|
| 4,028,173 A | 6/1977 | Olson | |
| 4,714,603 A | 12/1987 | Vanderheiden | |
| 4,874,466 A | 10/1989 | Savino | |
| 5,152,835 A | 10/1992 | Nemeh | |
| 5,215,580 A | 6/1993 | Elfenthal et al. | |
| 5,551,975 A | 9/1996 | Freeman et al. | |
| 5,650,002 A | * 7/1997 | Bolt ........................... | 106/438 |
| 5,861,209 A | 1/1999 | Haskins et al. | |
| 5,886,069 A | * 3/1999 | Bolt ........................... | 523/223 |
| 6,143,064 A | 11/2000 | Virtanen | |
| 6,200,375 B1 | 3/2001 | Guez et al. | |

FOREIGN PATENT DOCUMENTS

| | | |
|---|---|---|
| EP | 0799 865 A2 | 10/1997 |
| EP | 0 803 550 A2 | 10/1997 |
| EP | 0861299 B1 | 9/1998 |
| EP | 0892019 A1 | 1/1999 |
| EP | 0 803 550 A3 | 8/1999 |
| EP | 0799 865 A3 | 11/1999 |
| FR | 2 744 914 | 8/1997 |
| FR | 2 750 693 | 1/1998 |
| WO | WO 98/50472 | 11/1998 |
| WO | WO 00/32700 | 6/2000 |
| WO | WO 00/78874 | 12/2000 |

OTHER PUBLICATIONS

International Search Report.

\* cited by examiner

*Primary Examiner*—C. Melissa Koslow
*Assistant Examiner*—Shalie Manlove
(74) *Attorney, Agent, or Firm*—William D. Schmidt; David A. Kalow; Kalow & Springut LLP

(57) ABSTRACT

The present invention provides methods and compositions comprising inorganic solids for use as pigments in paints, papers and plastics.

17 Claims, 6 Drawing Sheets

PCC

PCC

PCC and Surfactant

PCC Spaced TiO$_2$

Silica Spacers with TiO$_2$

PCC spaced TiO2 produced by methods of prior art

PCC spaced TiO2 produced by methods of prior art

INORGANIC PARTICLES AND METHODS OF MAKING

This application claims the benefit of the filing date of U.S. Provisional Application No. 60/308,963 filed Jul. 30, 2001, entitled "Inorganic Particles and Methods of Making", this entire disclosure is hereby incorporated by reference into the present disclosure.

BACKGROUND OF THE INVENTION

Inorganic particles have a wide variety of uses as pigments or as additives to pigments that are important in the manufacture of paints, plastics, paper, laminates, coatings and other applications.

There have been significant efforts to produce inorganic pigments with desired characteristics (i.e., particle size, shape, coating and/or crystallinity) for the particular application. The prior art mixes, blends, or coats inorganic base particles with other inorganic solids to obtain compositions with useful properties such as brightness, opacity, and light scattering. Typically, insufficient mechanical dispersion of the base particle and other inorganic solids causes the composition to flocculate or agglomerate reducing, among other things, light-scattering, brightness and opacity. The tendency to flocculate or agglomerate can also be reduced by coating the inorganic base particles with suitable inorganic solids that effect the surface charge and other properties.

One particularly useful inorganic base particle comprises titanium dioxide. Titanium dioxide base particles are often incorporated into paint, plastic, paper, or other coating systems. This pigment imparts desirable properties such as, for example, brightness, opacity, light scattering, and durability.

It is known that light-scattering characteristics of pigments do not improve greatly above a certain pigment concentration. One reason light-scattering efficiency is decreased at high pigment concentrations is an effect known as "crowding."

An inorganic pigment particle of optimum size may have a light scattering cross-section that is 3–4 times larger than the projected cross-section (area) of the pigment particle. At high pigment concentrations, where the pigment particles are close to each other, overlapping of light scattering cross-sections causes a severe reduction in the pigment's scattering efficiency. For example, in order to avoid crowding in a TiO2-based pigment when used in paper, the distance between the TiO2 pigment particles should be kept to about 0.1 $\mu$m or more apart.

The crowding effect becomes even more serious when pigment particles are blended or mixed, which often causes agglomeration of the particles in the resultant composition. This effect is particularly seen in some papermaking processes.

There are other factors that can affect the scattering efficiency of pigment mixtures with high pigment particle concentration, especially in papermaking processes. Scattering efficiency in these processes depends strongly on the medium in which the pigment particle is incorporated. For example, the scattering efficiency of pigment particles dispersed in air can be 2 to 3 times higher than the same pigment particles dispersed in resins or fillers.

In order to reduce the crowding effect, it is common to add an extender, also called a spacer or filler, to the pigment in order to space apart the pigment particles. Some spacers and fillers include calcium carbonate, clay, silica, alumina, and other metal oxide particles. Typically, spacers and fillers have a lower cost than the base inorganic solid (i.e., titanium dioxide) and therefore reduce the cost of the resultant pigment composition.

Considerable research effort has been directed to making pigment compositions having reduced amounts of base particles. There have been attempts to blend or mix base particles with other less expensive inorganic solids resulting in spaced pigment products. However, the resultant products from blending or mixing have poor light-scattering, brightness and opacity characteristics. For example, when clay is mechanically mixed or blended with titanium dioxide, it is not possible to control the distribution of clay spacer particles throughout the mixture uniformly because the clay particles do not attach effectively to the surfaces of the titanium dioxide particles. In addition, blending methods are especially susceptible to pigment particle agglomeration, which reduces light scattering characteristics of the pigment product.

Other methods of coating pigment particles seek to achieve better dispersion by forming the spacer particles in situ on the pigment particles. For example, precipitated calcium carbonate (PCC) spacer particles are deposited on the surface of titanium dioxide base particles by bubbling carbon dioxide through a slurry containing lime and titanium dioxide. This precipitation method achieves the making of PCC spacers, but does not provide proper control over the precipitated particle size. Common problems include insufficient size of the precipitated spacers and agglomeration of the spacers. These problems are due in part to the complexity of many factors that influence the formation of the spacers, such as reactant concentrations, additives, temperature, processing pH, ageing periods.

Based on the foregoing, there remains a need for methods and compositions with desired characteristics (i.e., particle size, shape, coating, or crystallinity) for end use applications. There is also a need for inorganic pigment methods and compositions with minimal agglomeration and improved light-scattering efficiency, brightness and/or opacity.

SUMMARY OF THE INVENTION

The present invention provides methods and compositions for changing the characteristics of pigments by precipitating inorganic solids in the presence of a suitable surfactant. The present invention provides compositions and methods that are cost-effective and produce inorganic compositions with minimal agglomeration and improved light-scattering efficiency, brightness and/or opacity. It has also been found that inorganic particles precipitated on the base particle can have substantially spherical shape and be a particular size that improves the light-scattering efficiency, brightness and/or opacity of the pigment composition.

In one embodiment, the present invention provides a pigment composition comprising one or more inorganic base particles and one or more substantially spherical shaped spacer particles deposited thereon, the pigment composition having a particle size range between about 0.1 and about 0.5 microns.

In another embodiment, the present invention provides a pigment composition comprising one or more titanium dioxide base particles, one or more substantially spherical shaped calcium carbonate particles deposited thereon and a surfactant, the pigment composition having a particle size range between about 0.1 and about 0.5 microns.

In yet another embodiment of the invention, an inorganic composition comprising one or more substantially spherical shaped inorganic particles, the particles having a size range between about 0.1 and about 1 microns is provided.

In one exemplary embodiment, the present invention provides an inorganic composition comprising one or more substantially spherical shaped calcium carbonate particles, the particles having a size range between about 0.1 and about 1 microns.

In another exemplary embodiment, of the present invention provides a method of preparing pigment particles comprising the steps of: preparing an aqueous slurry of base pigment particles, adding a surfactant and one or more than one spacer precursor to the slurry, and precipitating the spacer precursor on the base pigment particles under conditions so as to form substantially spherical shaped spacer particles on the base pigment particles, the base pigment particles having a particle size range between about 0.1 and about 0.5 microns.

In yet another exemplary embodiment, the present invention provides a method of making substantially spherical calcium carbonate particles comprising adding a surfactant to a source of calcium carbonate to obtain substantially spherical calcium carbonate particles.

In a preferred embodiment, the present invention provides a method of making substantially spherical calcium carbonate particles comprising adding carbon dioxide to a mixture comprising lime, water, and a surfactant to obtain substantially spherical calcium carbonate particles.

In a further embodiment, the present invention provides a pigment composition comprising one or more titanium dioxide base particles, one or more substantially spherical shaped silica particles deposited thereon and a surfactant, the silica having a particle size range between about 5 and about 50 nanometers.

In yet another preferred embodiment, the present invention provides a method of preparing titanium dioxide pigment particles comprising the steps of: preparing an aqueous slurry of base titanium dioxide, adding a surfactant and a source of calcium carbonate to the slurry, and precipitating calcium carbonate on the base titanium dioxide particles under conditions so as to form substantially spherical shaped calcium carbonate particles on the titanium dioxide particle, wherein the titanium dioxide particle has a particle size range between about 0.1 and about 0.5 microns.

In alternate embodiment, the present invention provides a method of preparing pigment particles comprising the steps of: preparing an aqueous slurry of base titanium dioxide pigment particles, adding a surfactant and one or more silica spacer precursors to the slurry, and precipitating the one or more silica spacer precursors on the base pigment particles under conditions so as to form substantially spherical shaped silica spacer particles on the base pigment particles, the base pigment particles having a particle size range between about 0.1 and about 0.5 microns.

In yet another alternate embodiment, the present invention provides paints, plastics and paper comprising the pigments of the present invention.

In other embodiments, the present invention provides paints, plastics and paper comprising the pigment made by the methods of the present invention.

BRIEF DESCRIPTION OF THE DRAWINGS

Preferred embodiments of the invention have been chosen for purposes of illustration and description, but are not intended in any way to restrict the scope of the invention. The preferred embodiments of certain aspects of the invention are shown in the accompanying figure, wherein.

DETAILED DESCRIPTION OF THE INVENTION

Figure 1:
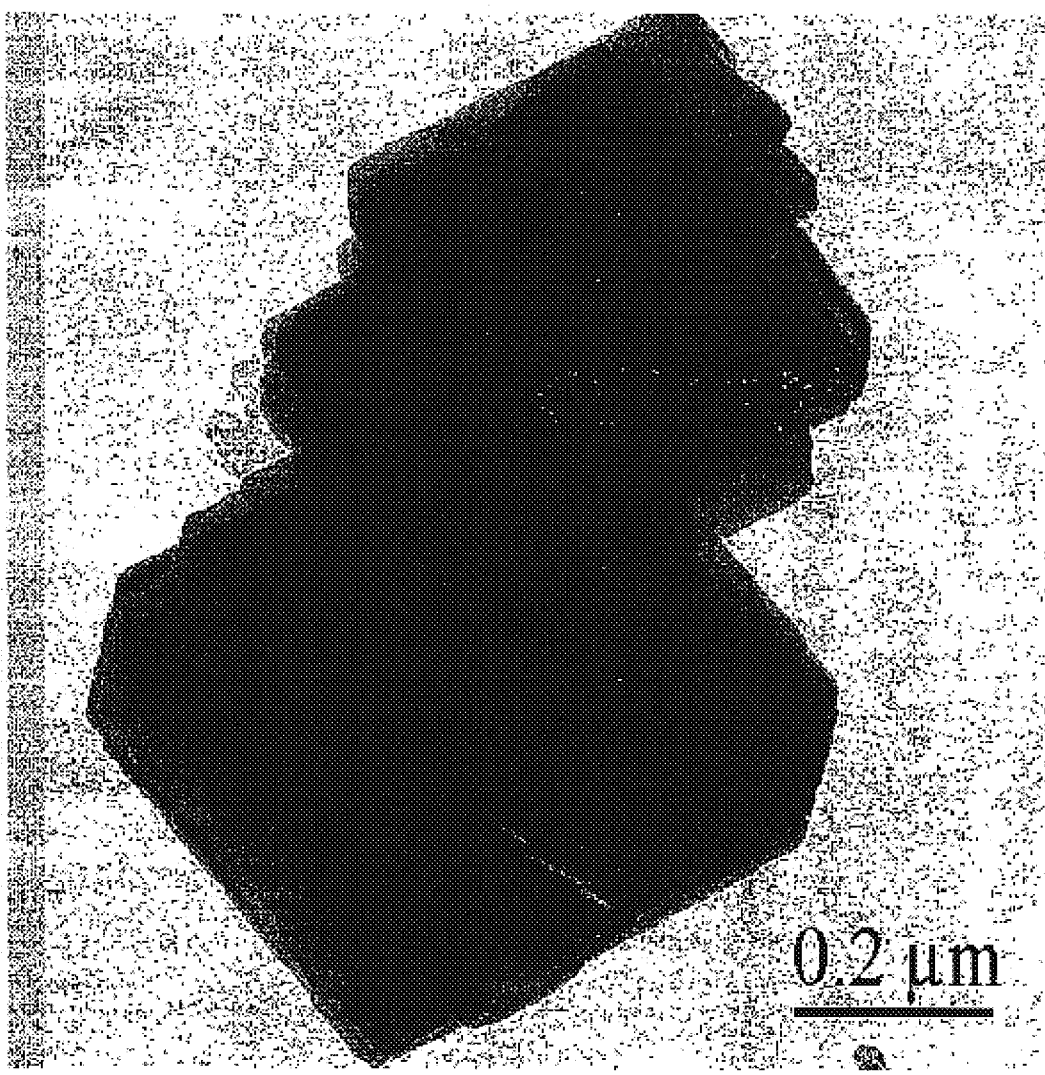
FIG. 1 is a transmission electron micrograph of precipitated calcium carbonate (PCC) particles formed in situ, without any surfactant. The calcium carbonate particles have a nearly square shape.

The invention will now be described in connection with preferred embodiments. These embodiments are presented to aid in an understanding of the present invention and are not intended to, and should not be construed to, limit the invention in any way. All alternatives, modifications and equivalents that may become obvious to those of ordinary skill on reading the disclosure are included within the spirit and scope of the present invention.

This disclosure is not a primer on pigment production, basic concepts known to those skilled in the field of pigment production have not been set forth in detail. Concepts such as choosing appropriate additives and reactions producing pigment are readily determinable by those skilled in the industry and are generally described in the prior art. Attention is therefore directed to the appropriate texts and references known to those skilled in the art in regard to these matters.

Inorganic Solids

Methods and compositions of the present invention include inorganic solids. As used herein, inorganic solids can be one or more than one inorganic particles. Inorganic solids also can be a spacer or surface coatings. Examples of inorganic solids include, but are not limited to particles of the following inorganic materials including those in hydrous form: oxides of silicon, titanium, zirconium, zinc, magnesium, aluminum, yttrium, antimony, cerium, and tin; sulfates of barium and calcium; sulfides of zinc; carbonates of zinc, calcium, magnesium, lead and mixed metals, such as naturally occurring dolmite which is a carbonate of calcium and magnesium, nitrides of aluminum; phosphates of aluminum, calcium, magnesium, zinc, and cerium; titanates of magnesium, calcium, and aluminum; fluorides of magnesium and calcium; silicates of zinc, zirconium, calcium, barium, magnesium, mixed alkaline earths and naturally occurring silicate minerals and the like; aluminosilicates of alkali and alkaline earths, and naturally occurring aluminosilicates and the like; aluminates of zinc, calcium, magnesium, and mixed alkaline earths; hydroxides of aluminum, diamond; clay or the like and above mixtures or composites thereof. As used herein, combinations thereof refers to mixtures of inorganic solids. As used herein, compositions refers to intimate combinations of two or more inorganic materials in a single particle or any other combination wherein at least two distinct inorganic materials are present in an aggregate particle.

Preferred inorganic particles are silica, titanium dioxide, zirconium oxide, zinc oxide, magnesium oxide, tin oxide, calcium carbonate, magnesium carbonate, calcium phosphate, aluminosilicates including alkali and alkaline earth aluminosilicates and naturally occurring aluminosilicate and the like, calcium silicates and naturally occurring silicate minerals and the above mixtures or composites thereof. Most preferred inorganic particles include titanium dioxide, calcium carbonate, clay, silica, zirconia, $CeO_2$ and the like. These inorganic particles can be used in the present compositions in a wide variety of weight-percentages easily determined by those skilled in the art. These inorganic particles can comprise the base pigment as discrete deposits on the base particle or can be separate particles alone without the base particle.

Spacer particles include inorganic particles that are not the base particles. Preferred particles are precipitated spacer particles include, but are not limited to, titanium dioxide, calcium carbonate, clay, silica, zirconia, $CeO_2$ and the like. These spacer particles can be deposited on the base particle or can be separate. Preferably, the spacer particles are substantially spherical in shape.

Spacer precursors include reactants that form the spacer particle upon a chemical reaction. Spacer precursors are not the spacer particle but must react to form the spacer particle. Preferred spacer precursors include, but are not limited to lime and CO2 gas for precipitation of calcium carbonate. For silica spacers, spacer precursors include, but are no limited to sodium silicate, potassium silicate, and the like, that provide a discrete deposit of SiO2 on the base particle.

After the precipitation process of one embodiment of the present invention, the resultant pigment composition comprises one or more inorganic base particle with one or more other inorganic particle deposited on the surface of the base particle. For example, preferred compositions of the present invention include one or more titanium dioxide base particles, one or more substantially spherical shaped calcium carbonate particles deposited thereon and optionally a surfactant, the pigment composition having a particle size range between about 0.1 and about 0.5 microns.

Another preferred pigment composition of the present invention includes one or more titanium dioxide base particles, one or more substantially spherical shaped precipitated silica particles deposited thereon and, optionally a surfactant, the pigment composition having a particle size range between about 5 and about 50 nanometers.

Solid Characteristics

Applicants have found that using a surfactant alters the morphology of the inorganic precipitated solid. Solid characteristics include external particle size, shape, coating, crystallinity, or combinations thereof.

Preferably, in one embodiment of the invention, the precipitated inorganic solids have a substantially spherical shape for certain embodiments of the present invention. As used herein, substantially spherical shapes includes inorganic particle deposits that are of a smooth rounded shape that lack projections and/or cavities on the surface.

Examples of substantially spherical shapes that are useful for this invention include, but are not limited to, spherical, spheroidal, globular and the like. For the purposes of the present invention, non-spherical shapes include irregular shaped inorganic particles that have projections and/or cavities on the surface. Such shapes include square, nearly square, rectangular, needle, rod, flake, and the like. Inorganic solids suitable for precipitation on the base particle include, for example, calcium carbonate, silica, alumina, zirconia or combinations thereof.

Surfactants

Surfactants are surface active agents that can alter the morphology of the inorganic precipitate. Suitable surfactants for use in the present invention include anionic, cationic, amphoteric, and non-ionic surfactants. The surfactant may be water soluble or hydrophobic. Suitable surfactants must interact with the precipitation of the inorganic solids on one or more base particles. The surfactant aids in viscosity, dispersibility, stability and resistance to flocculation when in a slurry.

A wide variety of surfactants can be used in the present invention. Suitable surfactants include polyacrylic acid. As used herein, polyacrylic acid includes polyacrylic acid derivatives. Some examples of polyacrylic acids and/or derivatives thereof include polyacrylic acid homopolymers, polyacrylic acid copolymers, and mixtures thereof. Preferably, the acrylic acid homopolymers and acrylic acid copolymers of the present invention include at least one comonomer selected from the group consisting of maleic acid, methacrylic acid, itaconic acid, crotonic acid, fumaric acid, acrylamide, acrylonitrile, ethylene, propylene, styrene and esters of the above acids, wherein the homopolymers or copolymers have been partially or completely neutralized with a neutralizing agent having a monovalent group. These surfactants can be present in amounts up to about 5 weight-percent. When the surfactant is used in titanium dioxide pigments, the surfactant is present in amounts of from about 0.05 to about 2 weight-percent, more preferably from about 0.2 to about 1 weight-percent; and most preferably from about 0.2 to about 0.5 weight-percent based on the total weight of titanium dioxide.

Suitable phosphate surfactants for use in the present invention include water soluble phosphate compounds, such as for example, tetrapotassium pyrophosphate, sodium polyphosphate, tetrasodium pyrophosphate (Tetron™), sodium tripolyphosphate, potassium tripolyphosphate, sodium hexametaphosphate (Calgon™), phosphoric acid, and the like.

Titanium Dioxide

In one embodiment, the present invention includes a pigment composition comprising one or more inorganic base particles and one or more substantially spherical shaped spacer solids deposited thereon, the pigment composition having a particle size range between about 0.1 and about 0.5 microns.

The preferred base pigment of the present invention includes titanium dioxide. Titanium dioxide pigment bases are produced commercially in two crystalline polymorphic forms, namely the rutile form which can be produced by either the chloride and sulfate processes and the anatase form which is normally produced by the sulfate process. Both of these processes are well known in the art. The titanium dioxide may include small quantities of impurities (i.e., iron), additives (i.e., potassium oxide), and surface coatings. Surface coatings are distinguishable from discrete particle deposits or precipitated particles. Generally, surface coatings are coatings of one or more layer around the base particle, as opposed to discrete deposits precipitated on the base particle.

Generally, the $TiO_2$ base pigments useful in the process of this invention will have a substantially uniform particle size.

The process of the present invention comprises the formation of an initial aqueous slurry of the base pigment. Slurries of base pigment can be made by methods known in the art. Titanium dioxide slurries, for example, of the present invention have a $TiO_2$ solids content of less than about 50%, preferably less than about 40%, and more preferably less than about 30% by weight of the slurry.

Precipitated Calcium Carbonate

In one embodiment of the present invention, discrete calcium carbonate particles are deposited by precipitation on titanium dioxide base pigment. The precipitation reaction is conducted in the presence of a surfactant as defined above. Preferably, the surfactant is present before the precipitation reaction is started. When the surfactant is used in titanium dioxide pigments, the surfactant is present in amounts of from about 0.05 to about 2 weight-percent, more preferably from about 0.2 to about 1 or 2 weight-percent; and most preferably from about 0.2 to about 0.5 weight-percent based on the total weight of titanium dioxide. This method is different from the prior art that uses blending. The discrete calcium carbonate particles preferably have diameters of between about 0.1 micrometer to about 1 micrometer and are precipitated onto the surface of well-dispersed $TiO_2$ aqueous slurry.

Lime and $CO_2$ gas can be used as the spacer precursors for making $CaCO_3$ particles. For example, in one embodiment of the present invention, inorganic spacer particles, such as calcium carbonate (CaCO3) are formed in situ on the TiO2 base particle. In this embodiment, an aqueous slurry of TiO2 base particles is mixed with a surfactant, then spacer precursors such as hydrated lime (Ca(OH)2) is added. Hydrated lime is thoroughly dispersed in the TiO2 slurry. Carbon dioxide gas (CO2) is then bubbled into the mixed slurry converting the hydrated lime (Ca(OH)2) to calcium carbonate (CaCO3). It is also possible to use hydrated lime (Ca(OH)2) in dry powder form. In an alternative embodiment, lime (CaO) can be hydrated separately by mixing with water, i.e., slaking, and this hydrated lime slurry can then be added to the TiO2 slurry having the surfactant. Alternatively, the lime (CaO) can be directly added to the TiO2 slurry having the surfactant so that it hydrates in the presence of the TiO2 particles, and this technique is preferred over the above slaking technique.

The resulting slurry preferably comprises greater than 20 weight percent of precipitated calcium carbonate based on $TiO_2$ pigment weight. The preferred weight percentage of calcium carbonate is between about 20% to about 80% based on the weight of $TiO_2$. Addition rate of lime into the $TiO_2$ slurry will affect the scattering efficiency of the final products.

The addition rate is controlled according to conductivity or pH of the slurry. The conductivity of the slurry can in turn be controlled by the $CO_2$ purging rate.

$CO_2$ gas used in this invention can be pure or blended with air with a fixed ratio (for example, 15/85). The $CO_2$ gas flow rate is very important to not only the pH of the whole system but also the resulting precipitated calcium carbonate properties.

In other embodiments of the present invention, alum is added to the precipitation reaction to control processing viscosity. The weight percentage of alum is between about 0.05 to about 2% based on the total weight of the pigment.

Suitable conditions include temperature and pH of the slurry and the precipitation reaction. Preferred pH ranges are from about 6.5 to about 7.5. The pH of the slurry is adjusted simultaneously in order to deposit the inorganic solid on the surface of the base titanium dioxide pigment. The specific pH can be determined by those skilled in the art and adjusted to a desired pH range used by methods known in the art. For example, if adjustment of the pH of the slurry becomes necessary, such adjustments can be made by simply adding a suitable acid or suitable base as discussed above.

The temperature of the slurry can be controlled to maximize the deposition of the inorganic particle on the pigment. Preferably, temperatures between about 5° C. to about 60° C. are needed for the precipitation reaction. System pH is also controlled by $CO_2$ flow rate, lime addition rate, and alum addition (if used). This depends on the batch size and can easily be determined by those skilled in the art. Although conductivity is a more accurate way of controlling the process, pH control is simpler and sufficient for the present invention.

The resulting precipitated calcium carbonate particles have a particle size between about 0.1 to about 1 micron. Preferably, the precipitated calcium carbonate particles have a substantially spherical shape.

In an alternate embodiment, the present invention includes an inorganic composition comprising one or more substantially spherical shaped calcium carbonate particles, the particles having a size range between about 0.1 and about 1 microns. These substantially spherical shaped calcium carbonate particles can have the surfactant in the composition. Other times, they may not have the surfactant in the final composition.

The present invention also includes a method of making substantially spherical calcium carbonate particles comprising adding a surfactant to a source of calcium carbonate. Sources of calcium carbonate include spacer precursors as defined above, such as for example, lime and CO2 gas.

The present invention is not limited to precipitated calcium carbonate, other kind of spacers can be applied.

Silica Precipitation

In one embodiment of the present invention, a silica compound or silica spacer precursor is precipitated on the $TiO_2$ base pigment. Silica compounds or silica spacer precursor suitable for use in the present invention include, but are not limited to, water soluble alkali metal silicates. Preferred water soluble alkali metal silicates include sodium silicate, potassium silicate, and the like. Most preferably, the silica compound is sodium silicate that is precipitated on the base particle as SiO2.

The weight percent of the silica compound in the slurry can vary depending on extent of spacing desired. When silica is deposited on the titanium dioxide base pigment, preferably, the silica compound is added to the slurry in an amount such that the final pigment content comprises from about 2% to 20% by weight of silica based on the total weight of the titanium dioxide pigment.

In one embodiment of the present invention, discrete silica particles are deposited by precipitation on titanium dioxide base pigment in the presence of the surfactant. When the surfactant is used in titanium dioxide pigments, the surfactant is present in amounts of from about 0.05 to about 2 weight-percent, more preferably from about 0.2 to about 1 or 2 weight-percent; and most preferably from about 0.2 to about 0.5 weight-percent based on the total weight of titanium dioxide. Preferably, the surfactant is present before the precipitation reaction is started. This method is different from the prior art that uses blending.

The discrete silica particles preferably have diameters of between about 5 to 50 nanometers after precipitation onto the surface of well-dispersed TiO2 aqueous slurry. The silica spacers deposited on the titanium dioxide pigment comprises between about 5 to about 20% silica, based on the total weight of the pigment.

The particle shape of the silica spacers in this invention is almost spherical. This is comparable to the common commercial colloidal silica used for this purpose, (e.g., LUDOX), but which does not have the advantage of being bonded to the base particles.

Suitable conditions for the silica precipitation reaction include temperature and pH of the slurry. Preferred pH ranges are from about 4.5 to about 6.0. However, the specific pH can be determined by those skilled in the art and adjusted to a desired pH range used by methods known in the art. For example, if adjustment of the pH of the slurry becomes necessary, such adjustments can be made by simply adding a suitable acid or suitable base as discussed above.

The temperature of the slurry can be controlled to maximize the deposition of the silica spacer particle on the pigment. Preferably, temperatures between about 30° C. to about 90° C. are needed for the silica precipitation reaction.

Other Inorganic Deposits

In another embodiment of the present invention, an alumina compound alone or in combination with other solids can also be deposited oil the base pigment in the presence of a surfactant. Alumina compounds include hydrous alumina compounds alumina precursors, which include but are not limited to sodium aluminate, potassium aluminate, or aluminum sulfate. Most preferably, the alumina precursor is sodium aluminate or aluminum sulfate. The weight percent of the alumina compound can vary. When the alumina compound is precipitated on the titanium dioxide pigment, preferably, the alumina compound is added to the slurry in an amount to provide from about 1.5% to about 5.0% by weight alumina based upon the total weight of the titanium dioxide pigment.

In an alternate embodiment of the present invention, the titanium dioxide particles of the present invention a zirconia compound is precipitated on the base pigment in the presence of a surfactant. Zirconia precursors suitable for use in the present invention include the acidic salts of zirconia such as zirconium oxy-chloride, zirconyl sulfate, and the like. Most preferably, the zirconia precursor is zirconium oxy-chloride or zirconyl sulfate. When the zirconia compound is precipitated on the titanium dioxide pigment, preferably, the zirconia compound is deposited in an amount of from about 0.1% to about 5.0% by weight of zirconia based on the total weight of the titanium dioxide base.

Pigment Recovery

The pigment particles in some embodiments of the present invention can be washed substantially free of soluble salts adhering to the pigment, dried and then subjected to final comminution using fluid energy milling techniques known in the art. Optionally, the washed and dried pigment is micronized in a steam micronizer at intensities known by those skilled in the art to produce the desired particle size distribution.

Light-scattering Efficiency, Brightness and/or Opacity

The pigments produced by the methods of the present invention are suitable for use in paints, plastics, and coatings, where brightness and opacity and other desirable properties are needed.

Some test methods for light scattering efficiency, brightness and opacity in paper and paints are known in the art. For example, when testing pigments in paper, TAPPI methods such as T-220—physical testing of pulp handsheets that tests light scattering coefficients and paper strength, T-425 test opacity of paper, T-452 tests-brightness of pulp, paper, and paperboard.

For paints, ASTM methods such as D 2805 tests hiding power of paints by reflectometry, and D 2745 tests relative tinting strength of white pigments by reflectance measurements.

Having now generally described the invention, the same may be more readily understood through the following reference to the examples, which are provided by way of illustration and are not intended to limit the present invention unless specified.

EXAMPLES

Example 1

PCC without Surfactant and $TiO_2$ 1350 g of tap water was added in a 4-liter Pyrex reactor. The water was heated to 45° C. A gas flow of $CO_2$/Air with 15/85 ratio was introduced into the slurry. 100 g total weight of aqueous lime slurry which contained 24% by weight of dry lime was slowly added into the reactor with strong agitation. The reaction pH was controlled to between 6.8 to 7.5 by adjusting the lime and $CO_2$/Air addition rates. The final pH is about 7. The finished PCC sample was submitted for TEM examination. The TEM graph is shown in FIG. 1. The particles are squared shaped.

Example 2

Figure 2:
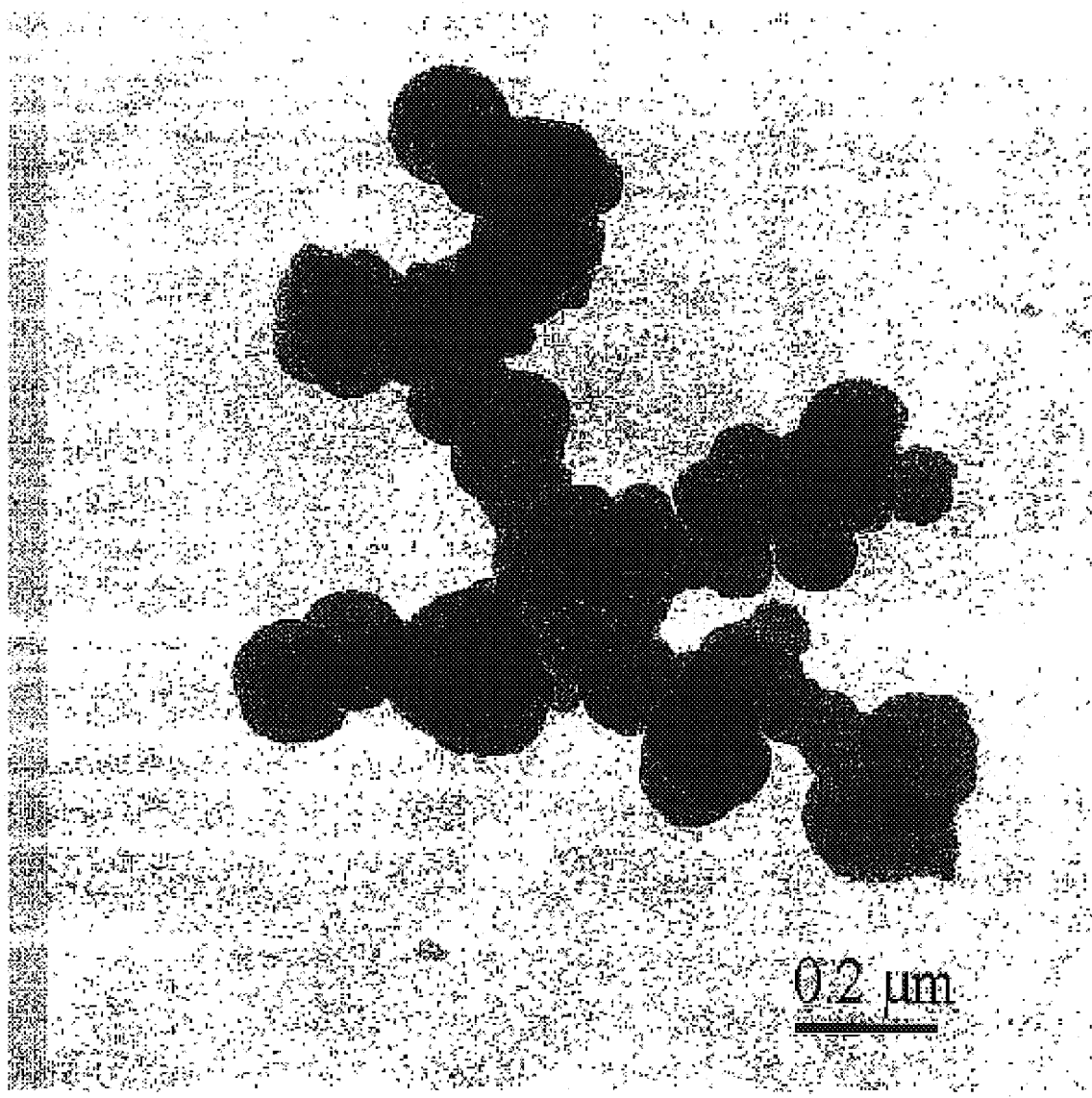
FIG. 2 is a transmission electron micrograph of calcium carbonate particles formed in situ, in the presence of 0.5% (by weight) polyacrylate surfactant. The calcium carbonate particles have a substantially spherical shape and have a size of about 0.2 microns.

Comparative to Example 1, with Surfactant 1350 g of tap water was added in a 4-liter Pyrex reactor. 1.53 gram of polyacrylate surfactant solution which contained 49 weight % polyacrylate was added into the water. The water was heated to 45° C. A gas flow of $CO_2$/Air (15/85 ratio) was introduced into the slurry. 100 g total weight of aqueous lime slurry which contained 24 weight % of dry lime was slowly added into the reactor with strong agitation. The reaction pH was controlled to between 6.8 to 7.5 by adjusting the lime and $CO_2$/Air addition rates. The final pH is about 7. The finished PCC sample was submitted for TEM examination. The TEM graph is shown in FIG. 2. Comparing to Example 1, it is seen that the PCC particles are substantially spherical with the size between about 0.1 to about 0.3 micrometers.

Example 3

Figure 3:
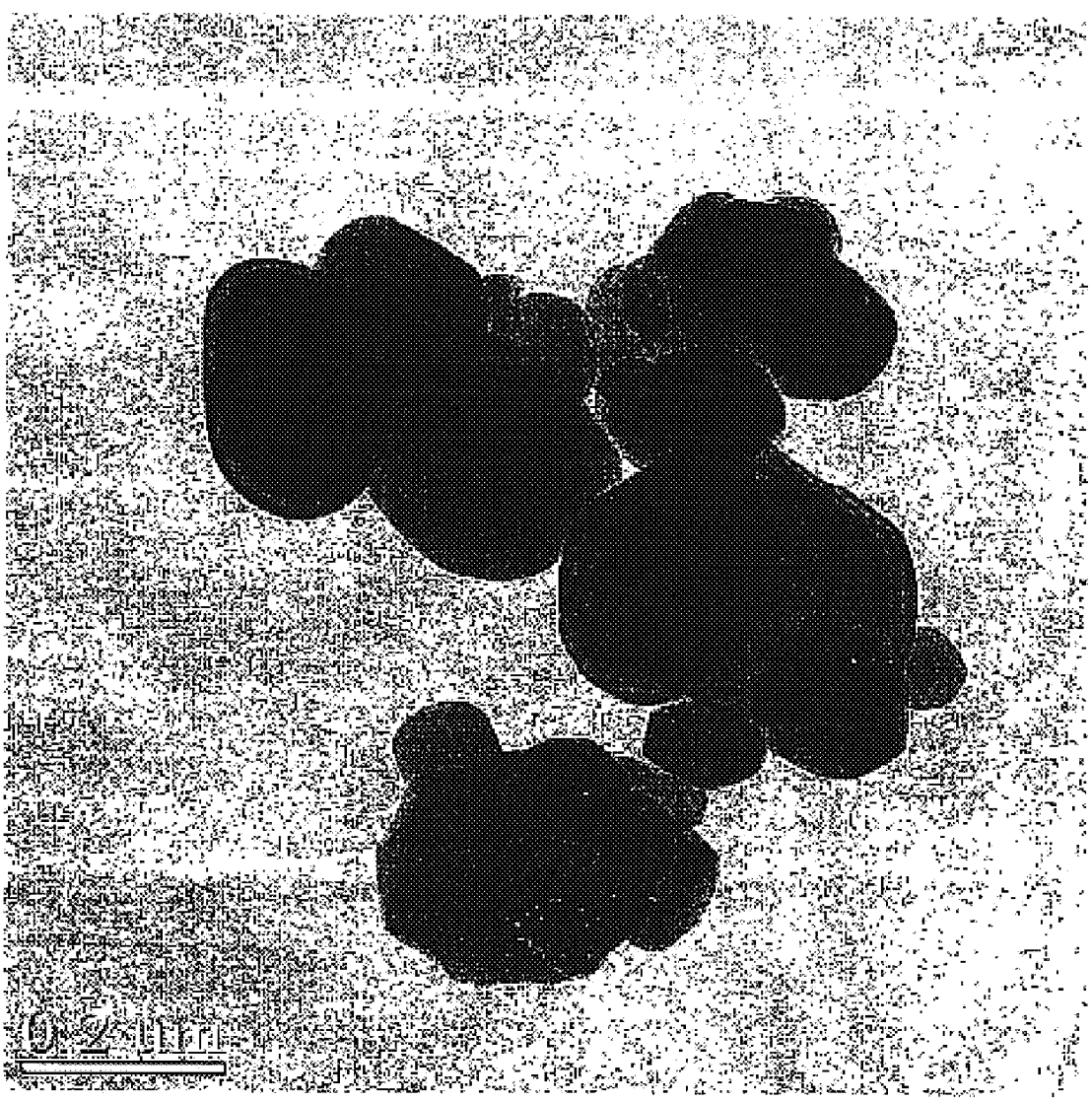
FIG. 3 is a transmission electron micrograph of PCC-spaced titanium dioxide particles made by in situ formation of PCC in the presence of 0.25% (based on $TiO_2$ weight) of calcium salt of polyacrylic acid. The calcium carbonate particles have a substantially spherical shape.

200 g of $TiO_2$ slurry (TiONA 4000, Millennium Inorganic Chemicals, about 79% solids, sulfate anatase) was diluted with 1200 g of tap water and dispersed in a 4-litre Pyrex constant temperature reactor. The slurry contains 0.25% (based on $TiO_2$ weight) of calcium salt of polyacrylic acid. The slurry is heated to 45° C. To the slurry, 6 ml of 10% alum solution was added. A gas flow of $CO_2$ (industrial grade) was introduced into the slurry. 136 g of dry reagent grade lime was slowly added into the slurry with strong agitation. The processing pH was controlled at 7 by adding 10% alum solution (with lime & $CO_2$). The final pH is about 7.5. The total reaction consumes total 24 ml of alum solution and takes about 1 hour and 10 minutes. The particle size of the PCC is about 0.1 to about 0.3 micrometers. The finished sample was submitted for TEM examination. The TEM graph is shown in FIG. 3.

Example 4

50 g of $TiO_2$ slurry (RCS-P, Millennium Inorganic Chemicals, about 74% solids, chloride rutile) was diluted with 300 g of tap water. The slurry contains 0.3% of TKPP (tetra-potassium pyrophosphate based on $TiO_2$ weight), no alum was used. A gas flow of $CO_2$ (industrial grade) was introduced into the slurry. 36 g of dry lime was slowly added into the slurry with strong agitation. The processing pH was controlled at 7 to 7.5 by adding $CO_2$ and lime. The final pH is about 8. The total reaction takes about 1 hour and 10 minutes. The particle size of the PCC is about 0.1 to about 0.3 micrometers.

Example 5

50 g of $TiO_2$ slurry (RL11A, Millennium Inorganic Chemicals, about 73% solids, sulfate rutile) was diluted with 300 g of tap water and dispersed with 0.5% of calcium salt of polyacrylic acid (based on $TiO_2$ weight) in 600 ml beaker. The slurry is heated to 45° C. To the slurry, ¾ g of 10% alum solution was added. A gas flow of $CO_2$ (industrial grade) was introduced into the slurry. 34 g of dry lime was slowly added into the slurry with strong agitation. The processing pH was controlled at 7 to 7.5 by adding 10% alum solution (with $CO_2$ & lime). The final pH is about 7. The total reaction consumes total 5 ml of alum solution and takes about 1 hour and 10 minutes. The particle size of the PCC is about 0.1 to about 0.3 micrometers.

Example 6

50 g of $TiO_2$ slurry (AT-1 slurry, Millennium Inorganic Chemicals, about 78% solids, sulfate anatase) was diluted with 100 g of tap water and dispersed in a 250 ml beaker. The slurry contains 0.5% (based on TiO2 weight) of calcium salt of polyacrylic acid. The slurry is heated to 45° C. A gas flow of $CO_2$/air with 15/85 ratio was introduced into the slurry. 34 g of dry lime was slowly added into the slurry with strong agitation. The processing pH was controlled at 7 by gas flow rate. The final pH is about 7.6. The total reaction takes about 40 minutes. The particle size of the PCC is about 0.1 to about 0.3 micrometers.

Example 7

2000 g of rutile base slurry with 45.34% solids, adjust to about 24% solids. Treatment temperature is set at 70° C. 1.25% of $P_2O_5$ (by $TiO_2$ weight) was added in the form of polyphosphate. To this slurry, 6.5% of $SiO_2$ (by $TiO_2$ weight) was added in the form of sodium silicate while maintaining the pH under 5.5 using hydrochloric acid. After aged for 10 minutes, 5% of $SiO_2$ was added. Adjust the slurry pH to 4.8 and add in 5% of $Al_2O_3$ (by $TiO_2$ weight) in the form of sodium aluminate. After 10 minutes aging, adjust the pH to 8–8.2 with HCl, hold for 5 minutes and adjust the final pH to be 5.8.

Figure 4:
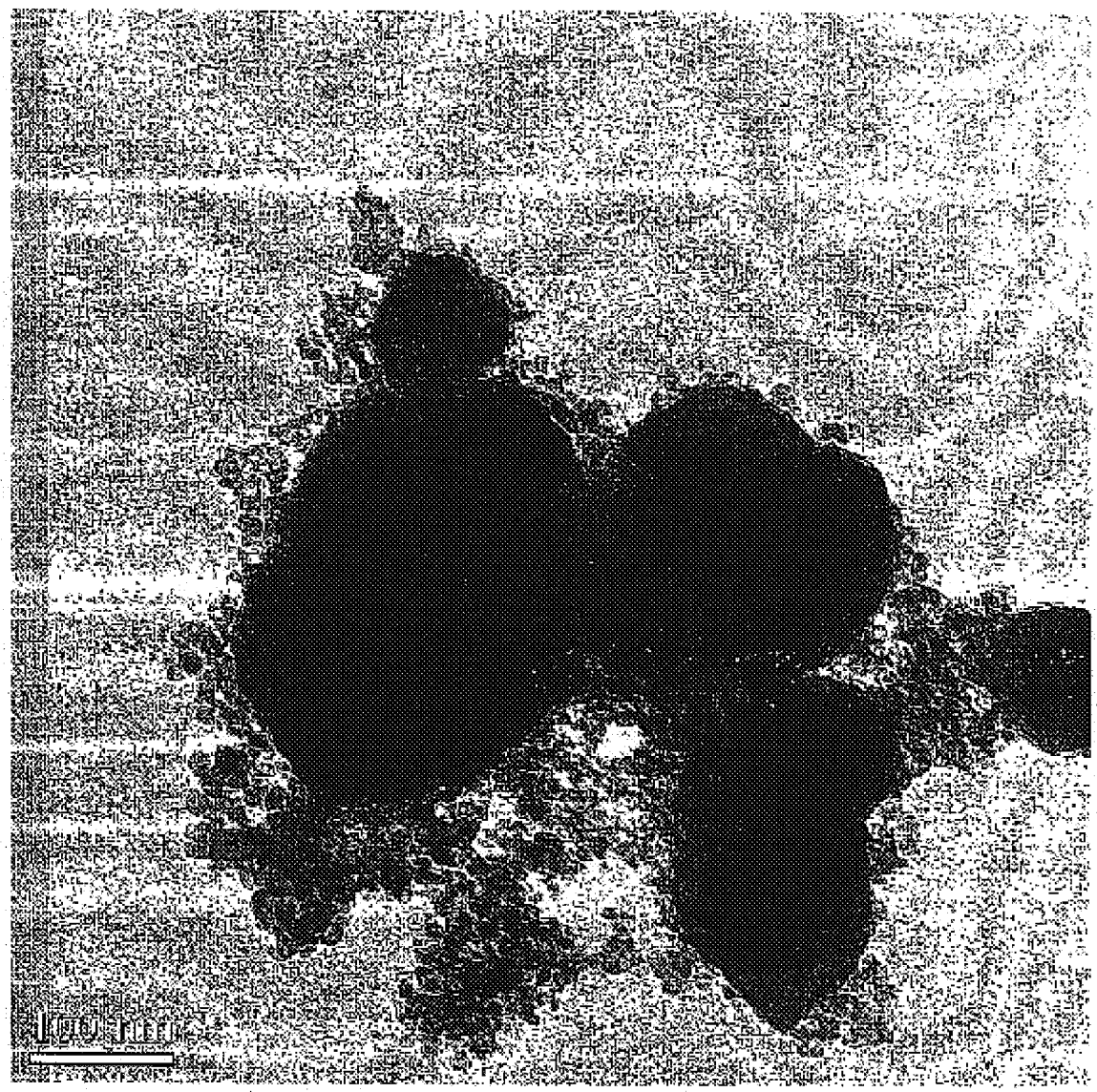
FIG. 4 is a transmission electron micrograph of silica-spaced titanium dioxide particles made by in situ formation of spherical silica particles. Silicon dioxide in the form of sodium silicate was added to titanium dioxide slurry in the presence of polyphosphate under carefully controlled conditions.

The resulting slurry was washed and filtered. The obtained wet cake was dried at 120° C. overnight. The TEM graph is shown in FIG. 4 which shows substantially spherical shaped silica particle.

Example 8
Prior Art Method of Precipitation on TiO2 without Surfactant

Figure 5:
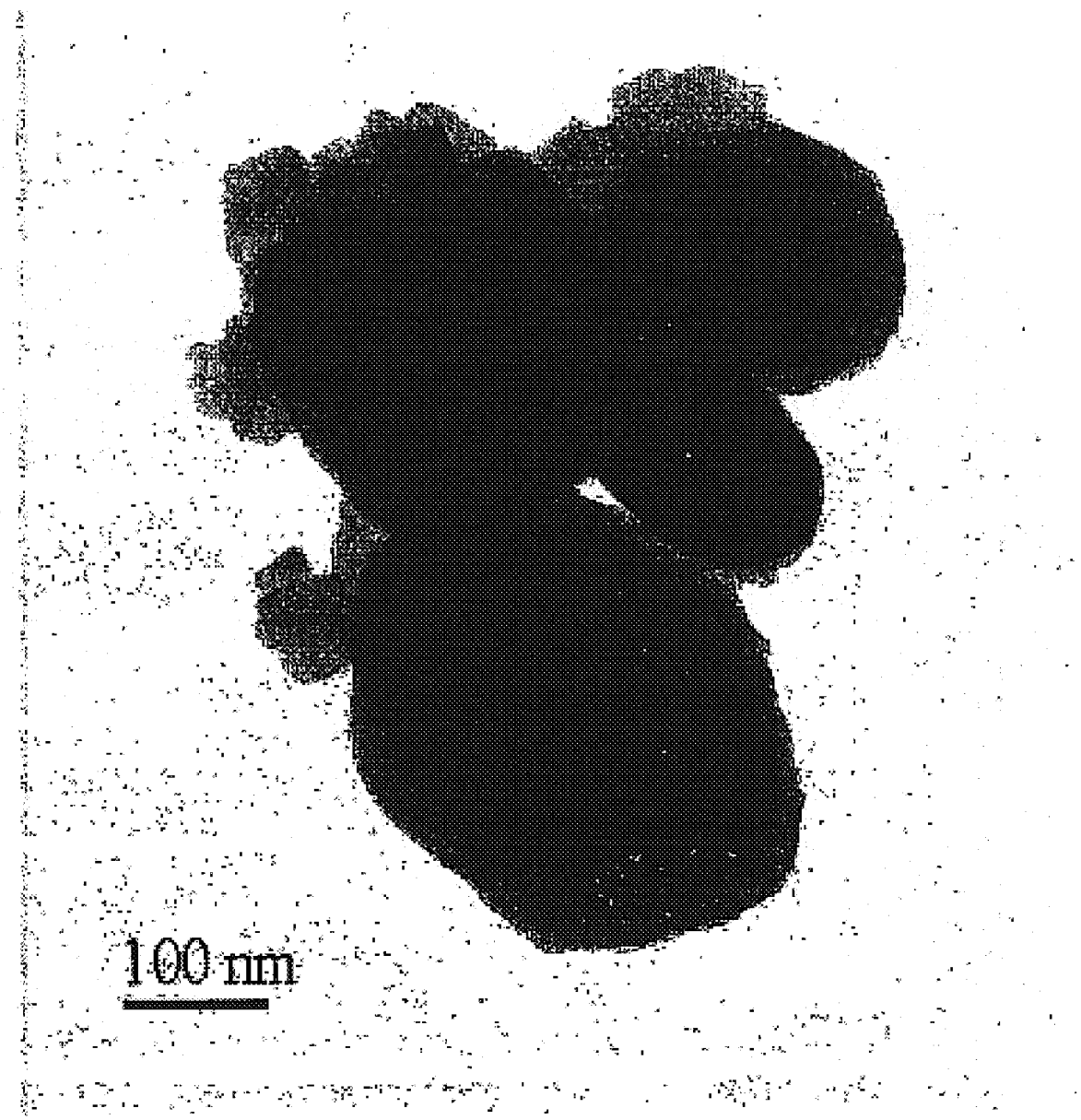
FIG. 5 is a transmission electron micrograph of PCC-spaced titanium dioxide particles formed by agitation without the presence of a surfactant. The spacer particles have a nearly square shape.
Figure 6:
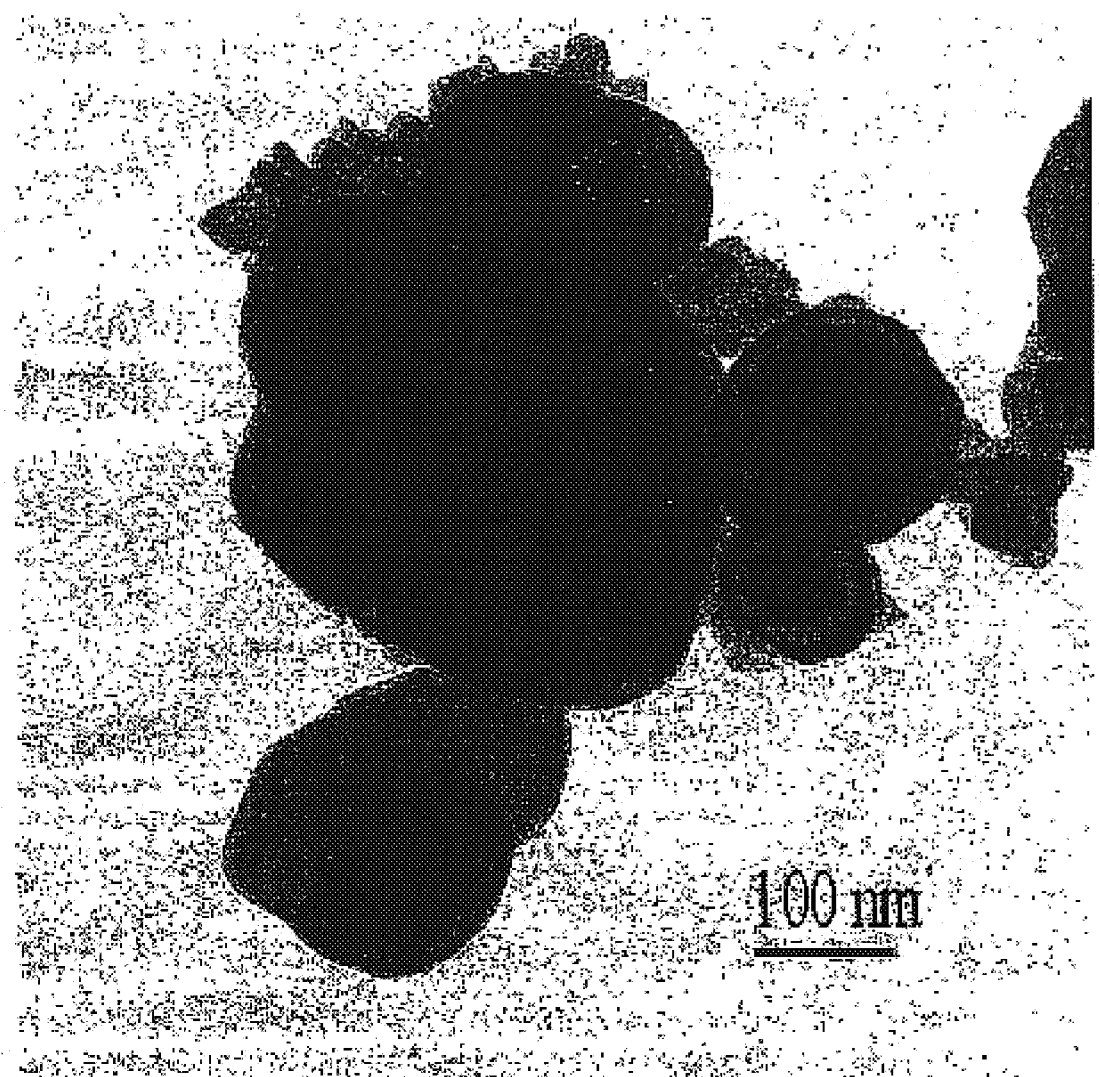
FIG. 6 is a transmission electron micrograph of PCC-spaced titanium dioxide particles formed by agitation without the presence of a surfactant. The spacer particles have a nearly square shape.

FIGS. 5 and 6 are Transmission Electron Micrographs of pigment obtained using a recipe described in the prior art in which $CaCO_3$ with particle sizes between about 20 to about 40 nanometers can be made to distribute on the $TiO_2$ surface without the in situ use of surfactants. As is clearly shown, the $CaCO_3$ particles are very small with mixed non-spherical shape in the range of about 20 to about 40 nanometers.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed is:

1. A method of making substantially spherical calcium carbonate particles comprising adding a surfactant to a source of calcium carbonate to obtain substantially spherical calcium carbonate particles having a particle size range between about 0.1 and about 1 micron.

2. A method of making substantially spherical calcium carbonate particles comprising adding carbon dioxide to a mixture comprising lime, water, and a surfactant to obtain substantially spherical calcium carbonate particles having a particle size range between about 0.1 and about 1 micron.

3. A method of preparing titanium dioxide pigment particles comprising the steps of:
   a) preparing an aqueous slurry of base titanium dioxide particles;
   b) adding a surfactant and a source of calcium carbonate to the slurry; and
   c) precipitating calcium carbonate on the base titanium dioxide particles under conditions so as to form substantially spherical shaped calcium carbonate particles having a particle size range between about 0.1 and about 1 micron on the base titanium dioxide particles, wherein the base titanium dioxide particles have a particle size range between about 0.1 and about 0.5 microns.

4. A method according to claim 3, wherein the surfactant is selected from the group consisting of polyacrylic acid homopolymers, polyacrylic acid copolymers, and mixtures thereof.

5. A method according to claim 4, wherein the surfactant comprises a polyacrylic acid homopolymer or copolymer comprising at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymer or copolymer has been partially or completely neutralized with a neutralizing agent having a monovalent group.

6. A method according to claim 3, wherein the surfactant is a phosphate compound selected from the group consisting of tetrapotassium pyrophosphate, sodium polyphosphate, tetrasodium pyrophosphate, sodium tripolyphosphate, potassium tripolyphosphate, sodium hexametaphosphate, phosphoric acid, and mixtures thereof.

7. A paint, plastic or paper comprising a pigment made by the steps of:
   a) preparing an aqueous slurry of base titanium dioxide particles;
   b) adding a surfactant and a source of calcium carbonate to the slurry; and
   c) precipitating calcium carbonate on the base titanium dioxide particles under conditions so as to form substantially spherical shaped calcium carbonate particles having a particle size range between about 0.1 and about 1 micron on the base titanium dioxide particles, wherein the base titanium dioxide particles have a particle size range between about 0.1 and about 0.5 microns.

8. A method according to claim 1, wherein the substantially spherical calcium carbonate particles are precipitated on base particles of anatase or rutile titanium dioxide.

9. A method according to claim 1, wherein the surfactant is selected from the group consisting of polyacrylic acid homopolymers, polyacrylic acid copolymers, and mixtures thereof.

10. A method according to claim 1, wherein the surfactant comprises a polyacrylic acid homopolymer or copolymer comprising at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymer or copolymer has been partially or completely neutralized with a neutralizing agent having a monovalent group.

11. A method according to claim 1, wherein the surfactant is a phosphate compound selected from the group consisting of tetrapotassium pyrophosphate, sodium polyphosphate, tetrasodium pyrophosphate, sodium tripolyphosphate, potassium tripolyphosphate, sodium hexametaphosphate, phosphoric acid, and mixtures thereof.

12. A method according to claim 1, wherein the substantially spherical calcium carbonate particles have a particle size range between about 0.1 and about 0.5 microns.

13. A method according to claim 2, wherein the substantially spherical calcium carbonate particles are precipitated on base particles of anatase or rutile titanium dioxide.

14. A method according to claim 2, wherein the surfactant is selected from the group consisting of polyacrylic acid homopolymers, polyacrylic acid copolymers, and mixtures thereof.

15. A method according to claim 2, wherein the surfactant comprises a polyacrylic acid homopolymer or copolymer comprising at least one comonomer selected from the group consisting of maleic acid, methacrylic acid, itaconic acid, crotonic acid, fumaric acid, acrylamide, acrylonitrile, ethylene, propylene, styrene and esters of the acids, wherein the homopolymer or copolymer has been partially or completely neutralized with a neutralizing agent having a monovalent group.

16. A method according to claim 2, wherein the surfactant is a phosphate compound selected from the group consisting of tetrapotassium pyrophosphate, sodium polyphosphate, tetrasodium pyrophosphate, sodium tripolyphosphate, potassium tripolyphosphate, sodium hexametaphosphate, phosphoric acid, and mixtures thereof.

17. A method according to claim 2, wherein the substantially spherical calcium carbonate particles have a particle size range between about 0.1 and about 0.5 microns.

* * * * *